(12) United States Patent
De'Longhi

(10) Patent No.: US 7,105,780 B2
(45) Date of Patent: Sep. 12, 2006

(54) COOKING DEVICE AND PROCEDURE

(75) Inventor: Giuseppe De'Longhi, Treviso (IT)

(73) Assignee: De'Longhi S.P.A., Treviso (IT)

( * ) Notice: Subject to any disclaimer, the term of this patent is extended or adjusted under 35 U.S.C. 154(b) by 1 day.

(21) Appl. No.: 10/800,158

(22) Filed: Mar. 12, 2004

(65) Prior Publication Data

US 2004/0245238 A1    Dec. 9, 2004

(30) Foreign Application Priority Data

Jun. 6, 2003    (IT) .......................... MI2003A1145

(51) Int. Cl.
*F27D 11/00*    (2006.01)
*A47J 37/12*    (2006.01)

(52) U.S. Cl. .................. 219/436; 219/439; 99/403; 99/413; D7/354

(58) Field of Classification Search .............. 219/436, 219/439; 99/403, 413, 411; D7/354
See application file for complete search history.

(56) References Cited

U.S. PATENT DOCUMENTS 4,951,558 A * 8/1990 Figliuzzi .................... 99/336
4,995,312 A * 2/1991 Leiros ........................ 99/411

* cited by examiner

*Primary Examiner*—Shawntina Fuqua
(74) *Attorney, Agent, or Firm*—Andrew Wilford

(57) ABSTRACT

The cooking device has a tank with an electrical heater means containing a basket for the food connected to an actuator suitable for moving it between a position inside and a position at least partially outside the tank. A first temperature sensor of a portion of the tank and a timer are connected to a control for moving the basket in relation to the signals which the control receives from the temperature sensor and from the timer. In the cooking procedure when the first sensor detects the cooking temperature, the basket is lowered and, at the same time, the timer is started for a preset time period. At the end of the time period the control deactivates the heater and commands the removal of the basket from the tank.

40 Claims, 6 Drawing Sheets

COOKING DEVICE AND PROCEDURE

FIELD OF THE INVENTION

The present invention relates to a cooking device and method.

BACKGROUND OF THE INVENTION

Pasta-cooking devices and methods are known.

Currently, pasta cooking is carried out in pots containing water which is brought to the boil usually on hob plates.

When the water boils the pasta is put into the pot and it is left to cook for the necessary time.

Then, with cooking complete, the pasta is drained through a colander.

Conventional devices have numerous drawbacks which can be traced to the following.

The use of hob plates, often gas-burning, can be dangerous in particular when the pot is not watched over. Unforeseen boiling over of water or froth from the pot can indeed, put out the flame without interrupting the gas supply. The consequences in this case are easy to imagine.

Moreover, conventional devices require continuous surveillance also because the active presence of an operator is necessary who puts in the pasta, stirs, drains, etc. Otherwise the food obtained is of extremely poor quality.

Moreover, conventional devices require substantial experience to achieve appreciable results in particular with reference to the degree of cooking of the pasta. In many cases, indeed, precisely due to lack of experience, the pasta can be overcooked with very poor results.

OBJECTS OF THE INVENTION

The object of the present invention is to provide a cooking device and method which eliminates the aforementioned technical drawbacks of the prior art.

It is therefore an object of the invention to provide a cooking device which can work with full efficiency and safety and will ensure the quality of the cooked food, without the need to continually watch over and/or to actively participate, for example, in stirring of the food.

Another object of the invention is to provide a cooking device which is very safe and which, in particular, does not require the use of flammable gases.

It is also an object to provide a cooking device and method which allows various types of food, in particular pasta, to be cooked optimally even when the user has very limited cooking experience and which even allows people without any experience of cooking pasta and other foods to cook optimally.

SUMMARY OF THE INVENTION

These objects are attained through a cooking device which comprises a body which carries a tank with electrical heating means and containing a basket for containing the food to be cooked, said basket being connected to actuation means suitable for moving it between a position inside said tank and a position at least partially outside of it. The device comprises, moreover, a first temperature sensor of at least one portion of said tank and a timer connected to control the actuation means, for moving said basket, in relation to the signals which the control means receive from the temperature sensor and from the timer.

The invention also is a cooking method using a device which has heating means heat the water contained in the tank up to a predetermined temperature substantially coinciding with boiling temperature, when the first sensor detects that such a predetermined temperature has been reached the basket is lowered into said water and, at the same time, the timer is started for a preset time period. When the timer reaches the end of such a preset time period the control means deactivate the heating means and command the removal of the basket from the tank.

Further features and advantages of the invention shall become clearer from the description of a preferred but not exclusive embodiment of the cooking device and method illustrated in the accompanying drawing, in which.

SPECIFIC DESCRIPTION

Figure 1:
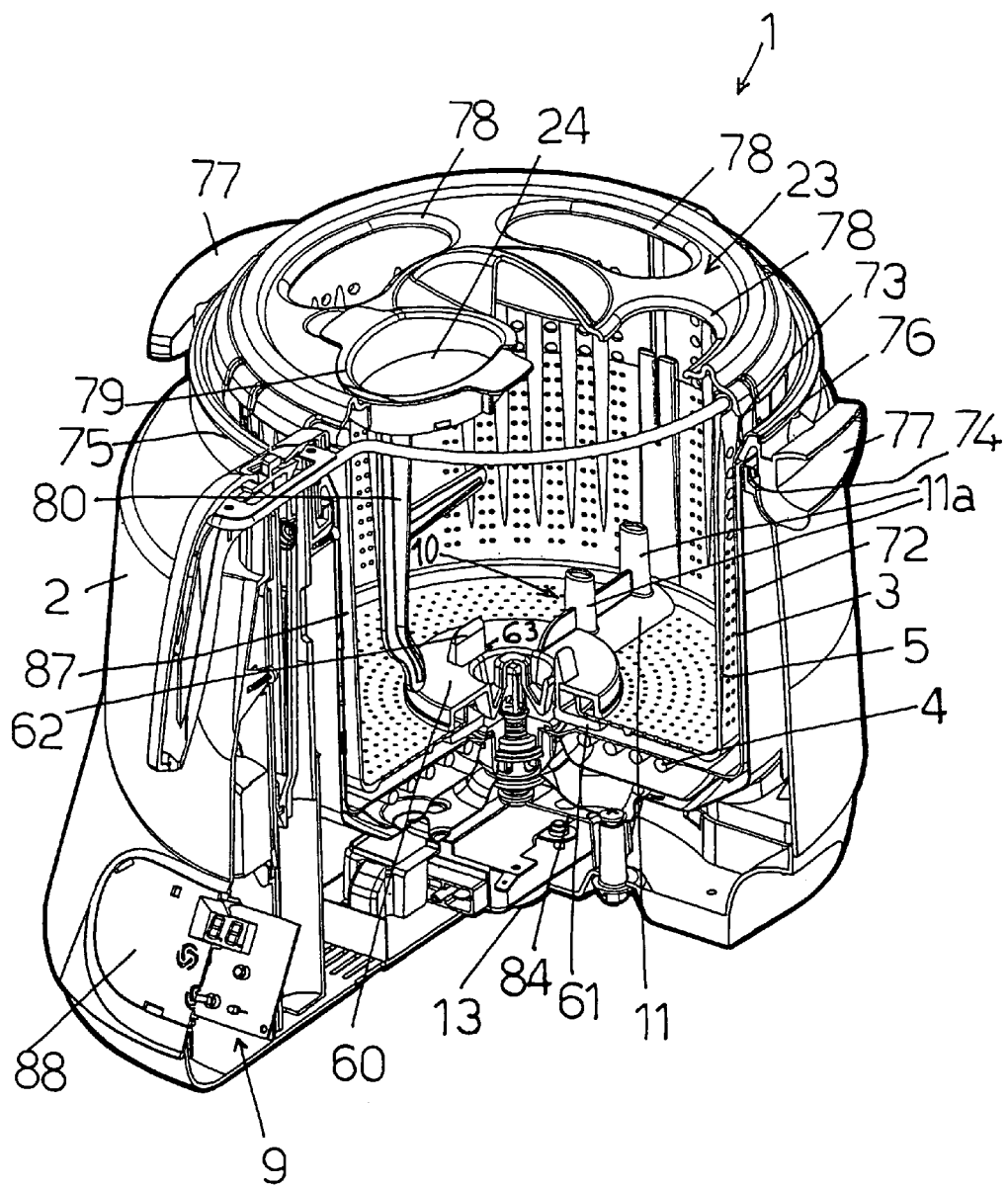
FIG. 1 is a perspective section view of the device according to the present invention with finding the outer cover removed.
Figure 2:
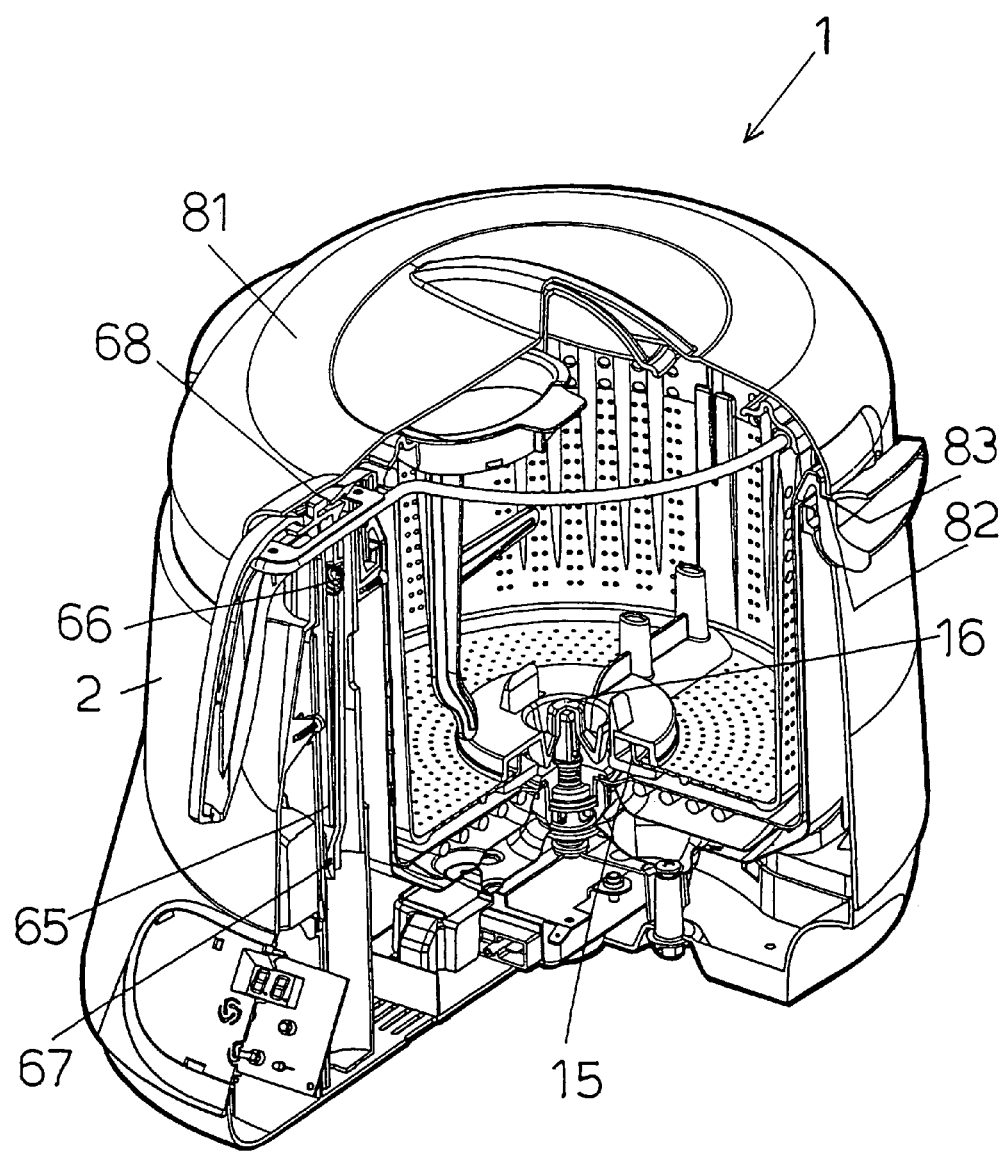
FIG. 2 is a perspective section view of the device according to the finding in which both the inner cover and the outer cover are present.
Figure 3:
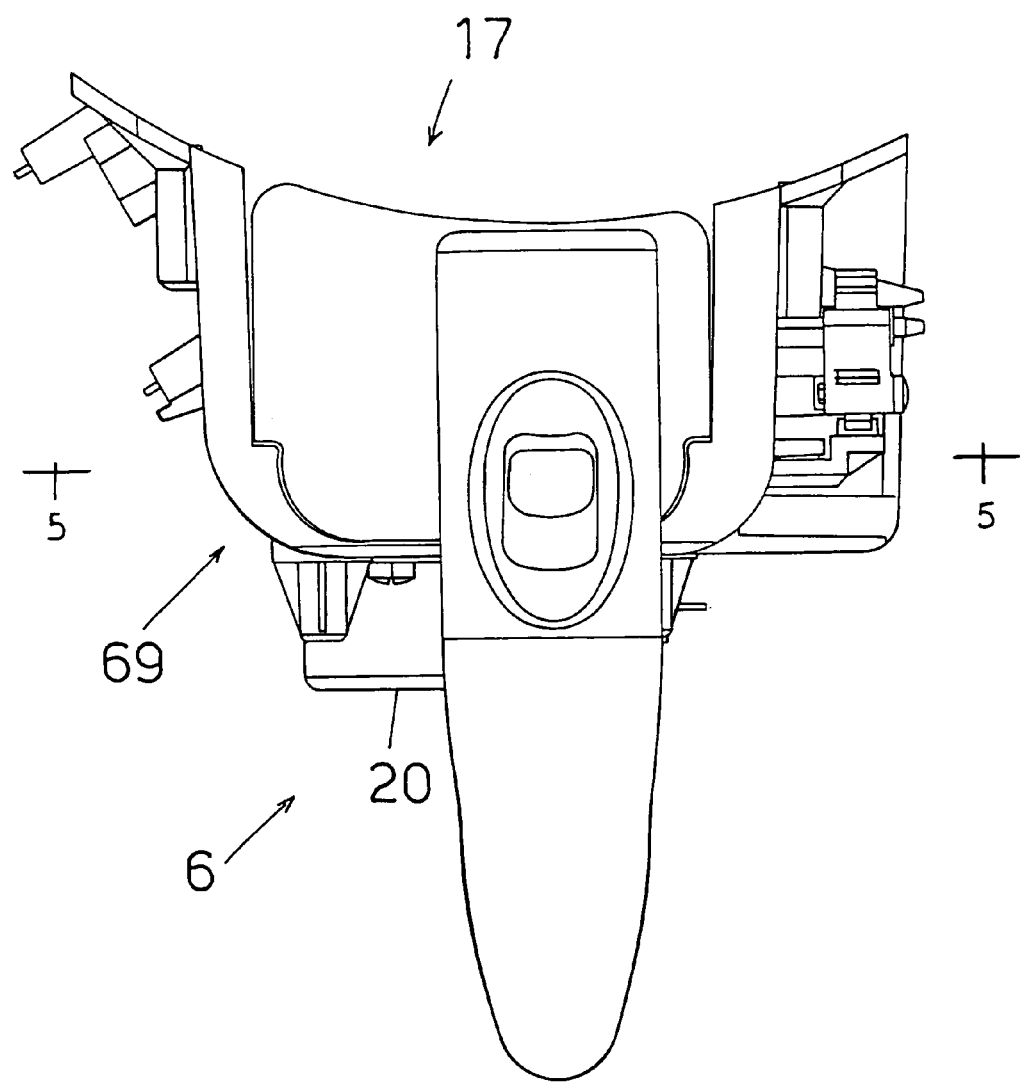
FIG. 3 is a top view of the support group of the basket and actuation means of the device.
Figure 4:
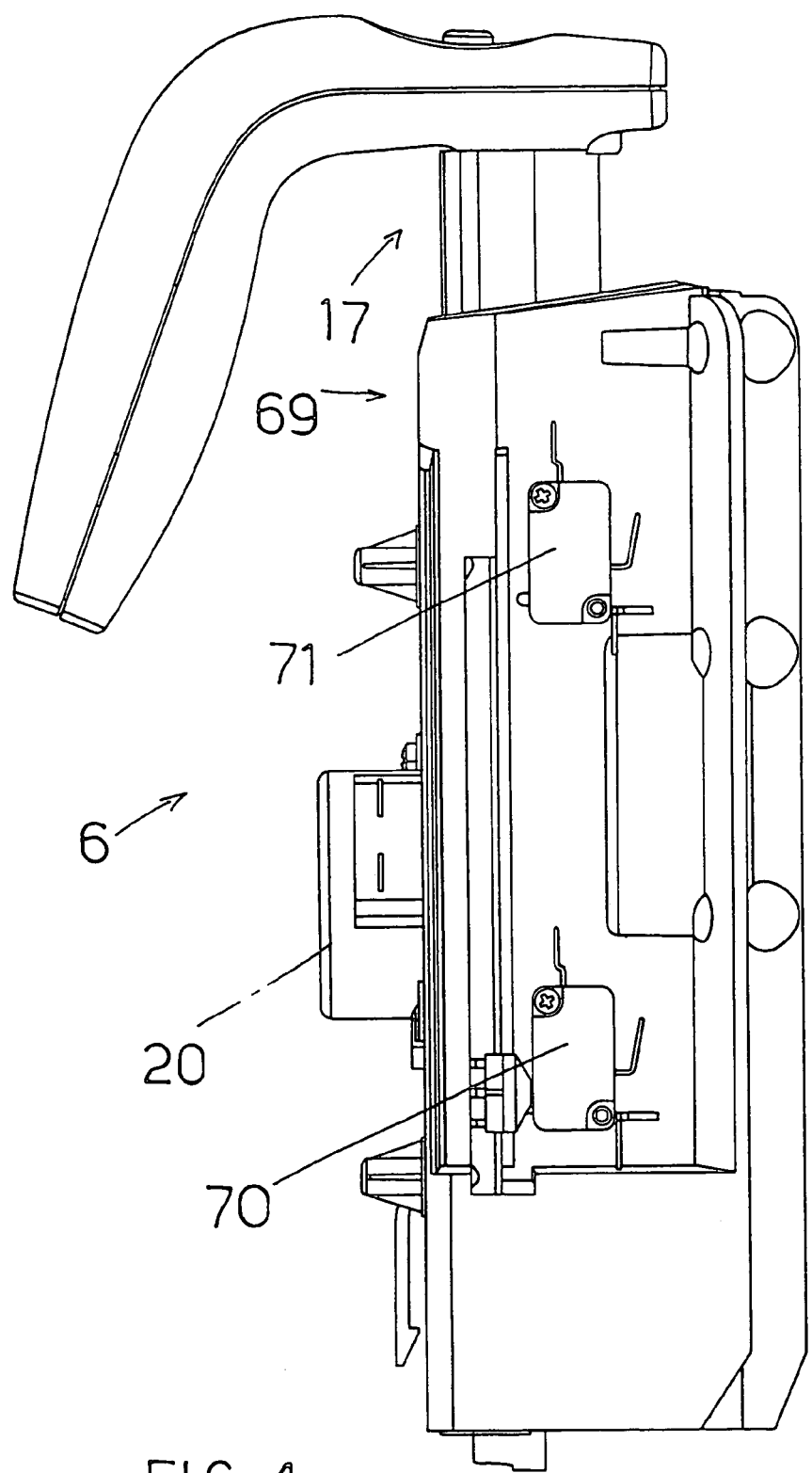
FIG. 4 is a top side view of the group of FIG. 3.
Figure 5:
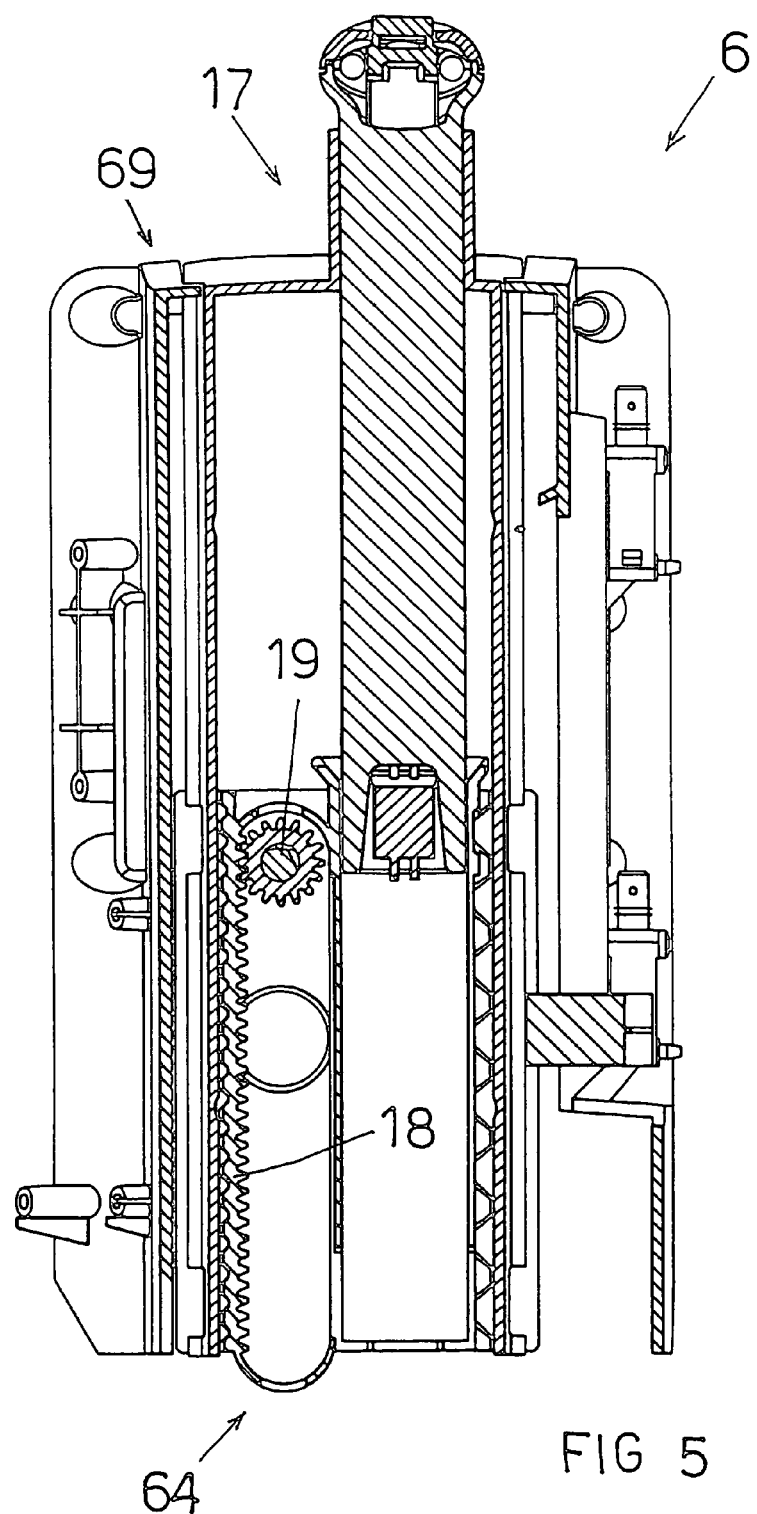
FIG. 5 is a view of the group of FIG. 3 sectioned along the line 5—5.

In the drawing a cooking appliance or apparatus, is shown.

The device 1 comprises a body 2 which carries a counter tank 72 suitable for housing a removable tank 3 inwardly of an electric heater 4 carried by the counter tank 72, for example consisting of armored electrical resistance heating elements.

A basket 5 for containing the food to be cooked is arranged inside the tank 3.

The basket 5 is connected to an actuator 6 suitable for moving it between a position inside the tank 3 and a position at least partially outside of it.

The device also comprises a first sensor (not shown) of the temperature of at least a portion of said tank and a timer (not shown) connected to control means 9, preferably but not exclusively realized through an electronic circuit board which, in turn, is connected to actuator means 6 so as to move the basket 5 in relation to the signals that the control means 9 receive from the temperature sensor and from the timer, between the position inside the tank 3 and the position at least partially outside of it.

Moreover, the device 1 comprises stirring means or stirrer 10 for the food contained inside the tank 5 which are also connected to the control means 9.

In particular, the stirring means 10 comprise an element 11 rotatably connected to the inner wall of the base of the basket 5 and removably connected to a pulling group 12 which projects from the body 2 and is connected to a first motor 13.

Advantageously, the first motor 13 has a protective element 84 which separates it from the tank 3 or more precisely, as we shall see, from the counter tank 72 which houses the tank 3.

Preferably, the rotatable element 11 comprises a radial vane from which extend projecting vanes 11a, the radial vane having a central part 60 rotatably held on the inner side of the base of the basket 5 through a counterpart 61 arranged on the outer side of the base of the basket 5 and associated with the part 60 through mutual hooking members 62, 63, preferably of the release type, operating inside the shaping of a through-seat 15 formed on the base of the basket 5.

Moreover, in a central zone of the central part 60 a seat 16 is defined suitable for receiving a portion of the pulling group 12.

The actuation means 6 comprise a basket support 17 that can be associated with a carriage 64 having a rack 18 operatively connected to a pinion 19 that can be actuated through a second motor 20, which is connected to the control means 9.

Between the basket support 17 and the carriage 64, means are provided for mutual removable hooking, preferably comprising a release lever 65 that can be actuated manually against and through the action of first elastic means 66 to releasably hook with a hooking member 67.

When the device 1 is not used, the removable hooking system between the support 17 for the basket 5 and the carriage 64 allows the basket 5 to be arranged in the lower position of its stroke independently of the position of the carriage 64, and therefore reduces the bulk of the device 1 to the minimum.

In particular, the release lever 65 is received in an inner housing of the support 17 for the basket 5 and has a lower end suitable for the hooking of the carriage 64 and an upper end which extends outside the support 17 for the basket 5 with a button 68 for its manual actuation.

The cooking device 1 also comprises a guide 69 suitable for guiding the support 17 for the basket 5 and the cursor 34 along a translation axis parallel to the direction of translation of the basket 5.

The guide 69 also defines a protective shell of the support 17 and of the cursor 34, and is open on the side facing the tank 3.

The cooking device 1 comprises at least one second sensor 70 and a third sensor 71, preferably in the form of microswitches, connected to the control means 9 and suitable for detecting the position inside and the position at least partially outside the basket 5, respectively.

Advantageously, the second sensor 70, the third sensor 71 and the second motor 20 are supported on the outer side of the guide 69 thus in a misaligned position with respect to the axis of translation of the support 17-carriage 64 group. Such an arrangement ensures optimal protection from possible leaking of water through the support 17.

Moreover, the tank 3 is removably connected to the body 2, i.e. so that it can be disassembled and reassembled; in this way the tank 3 can be removed to easily be emptied of water and washed.

Advantageously, to ensure safety, the device 1 comprises at least one fourth sensor of the presence of the tank 3.

The counter tank 72 externally associated with the tank 3 and fixed to the body 2, limits the dispersion of heat towards the outside of the tank 3 and gives the desired structural stability to the device 1. It also offers further protection to the actuation means 6 and control means 9, forming an additional barrier to water towards the electrical part of the device 1.

The tank 3 has an upper edge 73 that is raised with respect to the upper edge 74 of the counter tank 72 so as to optimally contain the water when its is boiling.

In any case, between the raised upper edge 73 of the tank 3 and the upper edge 74 of the counter tank 72 a deviation ring 75 is arranged which is held in a flap 76 of the raised upper edge 73 of the tank 3 and which advantageously extends with a grip 77 of the tank 3.

The grip 77 is, in particular, formed from two handles which extend from diametrically opposite points of the deviation ring 75.

The device 1 has a first lid 23 applied over the basket 5.

The lid 23 has at least one first hole and a second hole 78, and in particular three angularly spaced holes 78, suitable for holding long pasta, e.g. spaghetti, in a suitable position for stirring.

The lid 23 has at least one fourth hole 79 in which a container 24 is housed suspended in the basket 5.

For example, the container 24 is used for sauce, so as to heat or cook sauce at the same time as pasta.

The outer side of the base of the container 24 can be equipped with a fixed antirotation vane 80 of the pasta.

Alternatively, the container 24 can extend towards the inside of the tank 3 and define by itself a fixed stirring member.

Moreover, through the hole 79 it is also possible to control the progression of the cooking of the pasta or else pick up a sample of pasta to taste it and check the degree of cooking, in the case in which one prefers pasta that is cooked more or less than the optimal cooking instructions.

Removing the container 24, the hole 29 can be destined for the same task as the holes 28 such as to have four holes substantially angularly equally spaced apart, suitable for holding long pasta in the optimal position for stirring.

Over the lid 23 an outer lid 81 is applied which extends radially beyond the shaping of the inner lid 23 and has a peripheral edge 82 which rests in a suitable seat 83 formed on the grip 77 of the tank 3.

In a different embodiment of the present invention between the inner lid and the outer lid a space can be formed for housing a recipient with a perforated base for steam cooking.

The side wall of the basket 5 has a plurality of calibrated holes 86 suitable for redirecting the cooking liquid rising through the space 87 between the basket 5 and the tank 3 back inside the basket 5.

Such a plurality of calibrated holes 86 of the basket 5 is present at least on the zone of the side wall of the basket 5 facing the zone of the tank 3 that is most heated by the electrical heating means 4. The tank 3 is heated more at the half part of the coiled resistance 4 which has the terminal coil branch.

The space 87 widens at the upper part of the tank 3 so as to define an expansion chamber suitable for eliminating the foam possibly produced during the cooking of the pasta and for limiting the rising of the cooking liquid.

The size of the space 87 is a compromise between a minimum value suitable for eliminating foam and for limiting as much as possible the rise of the cooking liquid through it and a maximum value suitable for limiting as much as possible the bulk of the cooking device.

To keep the size of the space 87 at the desired value and to ensure the centering between the basket 5 and the tank 3, at least one spacer element (not shown) is foreseen between the basket 5 and the tank 3.

Moreover, anti-flexing means for the basket 5, in particular at least one hooking element (not shown) of an upper portion of the basket 5 to the tank 3, can be provided.

The device is also provided with a control panel 88 which allows the cooking times to be programmed and detected through a full 24 hours. In this way it is possible to freely set the moment in which one wishes to have the pasta drained. Suitably, moreover, when the device is not used the timer shows the current time and operates as a clock.

Figure 6:
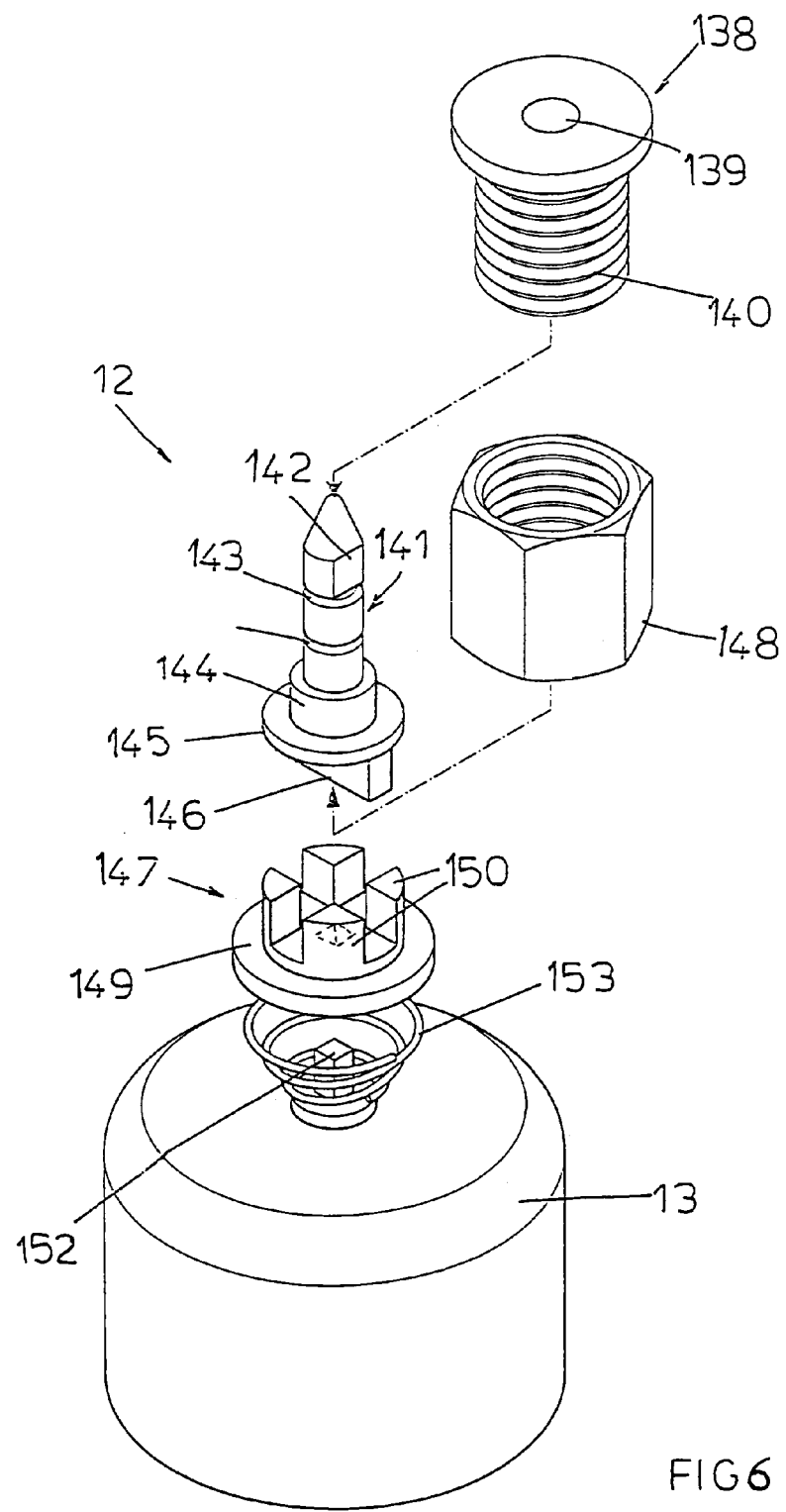
FIG. 6 is a detail view of the pulling group of the present invention.

FIG. 6 shows the pulling group 12 is greater detail.

It comprises a pin guide 138 slidably connected to the basket 5 and having an at least partially faceted inner hole 139 and a threaded lower portion 140. In the hole 139 a pin 141 is inserted (without the possibility of rotating), having a faceted portion 142 and two throats 143 which house seals (not shown). The lower part 144 of the pin is widened and is coated in Teflon to promote sliding. The pin 141 has, at the bottom, a perimetric edge 145 and a blade 146 suitable for connecting to a connection element 147 of the motor 13.

The pin 141 is connected to the pin guide 138 (and thus to the basket 5) by the nut 48. The connection element 147 comprises a disc 149 which has four projecting pins 150 (for example with a triangular section) and a square hole 151 in which the drive shaft 152 (also square) of the motor 13 is slidably inserted. Moreover, between the case of the motor 13 and the disc 149 a spring 153 is arranged which allows the clearances to be recovered.

When the basket 5 is lowered the blade 146 inserts between the pins 150 and ensures the connection and the actuation of the stirring means; if the blade 146 locks over the pins 150 the rotation of the disc 149 and the thrust of the spring 153 take the pulling group 12 back into the correct configuration.

The operation of the cooking device 1 according to the invention is clear from that which has been described and illustrated and, in particular, is substantially the following.

Hereafter reference shall firstly be made to the case in which the cooking of pasta is carried out immediately after the programming of the device and then to the case in which the pasta is cooked at a predetermined time of day, for example the device is programmed and prepared in the morning to obtain cooked and drained pasta at lunchtime.

In the first case (i.e. pasta cooked immediately after programming of the device), beforehand the tank 3 is filled with water and salt, the pasta is inserted into the basket 5 which is in raised position and the cooking time of the pasta is set.

Then the device is switched on and the heating means heat the water up to boiling.

In practice, the boiling temperature is recognized through the analysis of the profile of the rise in water temperature. Indeed, it has experimentally been found that the upward curve of the water temperature has a striking bend at the boiling point. Calculating the slope of the upward curve it is thus possible to tell that the boiling point has been reached. To avoid phenomena of disturbance caused by the user the algorithm used by the control means 9 for calculating the boiling point carries out a calculation which averages the slopes of the upward curve taken at various times.

When the temperature sensor detects that the water starts to boil, the control means 9 command the lowering of the basket 5 to the lower position signalled to the command means 9 by the second sensor 70 and the starting of the timer 8; at the same time a sound is also emitted through a buzzer (not represented).

After a certain time from the sinking of the basket 5 into the tank 3 the control means 9 actuate the motor 13 of the stirring means 10, to prevent the pasta from sticking.

Advantageously, moreover, the control means 9 cyclically activate and deactivate the heating means 4 and stirring means 10, so as to partialise the power transmitted to the water and to obtain a less turbulent boiling of the water with less foam production obtaining better stirring.

Suitably, a minute before the end of the set time period, the buzzer is once again activated by the control means 9 and emits another sound.

The cooking proceeds until the timer 8, when it detects the end of the set time period, sends a signal to the control means 9 which command the deactivation of the heating means 4 and the lifting of the basket 5 to the upper position signalled to the control means by the third sensor 71.

In the second case (i.e. pasta cooked at a predetermined time of day) the control means 9 activate the heating means 3 at the set time, the control means check (through the temperature sensor 7) the increase in temperature of the water (which depends upon the amount of water to be heated) and, in the case in which this is too quick, interrupt the power supply of the electric heating means and calculate the waiting time before starting to heat again.

Then, everything takes place as described previously, with the heating means which take the water to the boiling point and the basket which is immersed into the water to cook the pasta and, with cooking finished, removed.

Advantageously, the present invention also refers to a cooking procedure through a device of the type described previously.

The temperature sensor also operates as a safety element since when it detects a temperature greater than a safety temperature it interrupts the operation of the device.

According to the procedure the heating means 4 heat the water contained in the tank 3 up to boiling.

When the first temperature sensor detects that such a boiling point has been reached the basket 5 is lowered into the water and, at the same time, the timer is started for a preset time period.

When the timer reaches the end of such a preset time period the control means 9 deactivate the heating means 4 and command the removal of the basket 5 from the tank 3.

Advantageously, moreover, after a predetermined time period from the lowering of the basket 5 into the tank 3 the stirring means 10 are actuated; preferably, moreover, the heating means 4 and/or stirring means 10 are activated discontinuously, so as to partialise the power, to decrease the turbulence of the water and reduce foam production.

Of course, suitably programming the control means it is possible to adapt the cooking cycle to the particular food, and vary some operating parameters of the device as needed, like for example the speed of rotation of the pulling means.

In practice, it has been noted how the cooking device and procedure according to the invention are particularly advantageous because they allow in particular pasta but also other dishes to be cooked, without the need for continuous surveillance and always ensuring optimal results.

For example, indeed, the device according to the present finding also allows rice, custard, puddings, soups, polenta, etc., to be cooked. Moreover, suitably, the device can also be used to cook food with steam.

The cooking device and procedure thus conceived are capable of numerous modifications and variants, all of which are covered by the inventive concept; moreover, all of the details can be replaced by technically equivalent elements. In practice, the materials used, as well as the sizes, can be whatever according to requirements and the state of the art.

What is claimed is:

1. A cooking device comprising:
a body;
a tank carried on the body and adapted to hold water;
a basket received in the tank for containing a food to be cooked in the water in the tank;
electrical heating means on the body for heating the water in the tank and thereby cooking the food in the water in the tank;

actuation means connected to said basket for moving said basket between a lower position inside said tank with the food in the basket submersed in the water in the tank and an upper position at least partially outside of said tank with the food in the basket substantially out of the water in the tank;

a first temperature sensor for at least one portion of said tank;

a timer;

control means for said actuation means connected to said sensor and said timer for moving said basket in response to signals received from said temperature sensor and from said timer; and stirring means including a drive part carried on the body and a rotatable element mounted on the basket, movable in the basket, and couplable to the drive part when the basket is in the lower position for stirring said food when the basket is in the lower position.

2. The cooking device according to claim 1 wherein said stirring means comprise a first motor connected to the drive part.

3. The cooking device according to claim 2 wherein said rotatable element comprises a vane which has a central part defining a seat suitable for receiving a portion of said drive part.

4. The cooking device according to claim 3 wherein said central part is rotatably held on an inner side of a base of said basket through a counterpart arranged on an outer side of the base of said basket and associated with said central part of said vane through mutual release hooking members operating inside a shaping of a through-seat formed in the base of the basket.

5. The cooking device according to claim 2 wherein said actuation means comprise a support for said basket associated with a cursor having a rack operatively connected to a pinion actuated through a second motor, said second motor being connected to said control means.

6. The cooking device according to claim 5, further comprising removable hooking means between said support and said cursor.

7. The cooking device according to claim 6 wherein said removable hooking means between said support and said cursor comprise a release lever actuated manually against and through the action of first elastic means to hook to a hooking member.

8. The cooking device according to claim 5, further comprising at least one second sensor and, respectively, a third sensor connected to said control means and suitable for detecting the position inside and, respectively, the position at least partially outside said basket.

9. The cooking device according to claim 8 wherein said second and third sensors are microswitches.

10. The cooking device according to claim 9, further comprising a guide for the translation of said actuation means.

11. The cooking device according to claim 10 wherein said second and third sensors and said second motor lie in a misaligned position with respect to a translation axis of said actuation means.

12. The cooking device according to claim 11 wherein said guide defines a shell suitable for protecting, inside of it, said support and said cursor, and suitable for supporting, on the outside, said second and third sensors and said second motor.

13. The cooking device according to claim 12 wherein that said shell is open on the side facing said tank.

14. The cooking device according to claim 8 wherein said tank is removably connected to said body.

15. The cooking device according to claim 14 which has a counter tank which houses said tank inside of it.

16. The cooking device according to claim 15, further comprising at least one fourth sensor of the presence of said tank.

17. The cooking device according to claim 1, further comprising a first lid applied onto said basket.

18. The cooking device according to claim 17 wherein said first lid has at least one first and one second positioning hole for long pasta suitable for holding said long pasta in a suitable position for stirring.

19. The cooking device according to claim 18 wherein said first lid has at least one third hole in which a container is housed suspended in said basket.

20. The cooking device according to claim 19 wherein said container extends below with a fixed anti-rotation vane of the pasta.

21. The cooking device according to claim 20 in that said tank has an upper edge that is raised with respect to an upper edge of the counter tank.

22. The cooking device according to claim 21 wherein, between the upper edge of said tank and the upper edge of said counter tank a deviation ring is arranged suitable for deviating cooking liquid possibly escaping from said tank outside of said counter tank.

23. The cooking device according to claims 22 wherein said deviation ring is held in a flap of the upper edge of said tank wherein at least one grip of said tank extends from said deviation ring.

24. The cooking device according to claim 23, further comprising a second lid applied over said first lid.

25. The cooking device according to claim 24 wherein said second lid extends radially beyond the shaping of said tank and has a peripheral edge which rests in a seat of said grip of said tank.

26. The cooking device according to claim 15, further comprising a protective element for said first motor placed between said first motor and said counter tank.

27. The cooking device according to claims 1 wherein a side wall of said basket has a plurality of calibrated holes suitable for redirecting the cooking liquid rising through a space between said basket and said tank back inside said basket.

28. The cooking device according to claim 27 wherein said plurality of calibrated holes of the basket is present at least in a zone of the side wall of said basket facing a zone of the tank most heated by said electrical heating means.

29. The cooking device according to claim 28 wherein said space widens at the upper part of said tank so as to define an expansion chamber suitable for eliminating foam possibly produced during cooking and for limiting the rise of cooking liquid.

30. The cooking device according to claim 29 wherein the size of said space is chosen between a minimum value suitable for eliminating foam produced during cooking and for minimizing the rise of cooking liquid through said space, and a maximum value suitable for minimizing the bulk of the cooking device.

31. The cooking device according to claim 1, further comprising at least one spacer element between said basket and said tank to keep said basket centered in said tank.

32. The cooking device according to claim 1, further comprising an anti-flexion device for means of said basket.

33. The cooking device according to claim 32 wherein said anti-flexion device comprises at least one hooking element of an upper portion of said basket engaging said tank.

34. The cooking device according to claim 1 wherein said control means are in the form of an electric circuit board.

35. A cooking method using a device according to claim 1 or of operating said device wherein said heating means heat the water contained in the tank up to a predetermined temperature substantially coinciding with boiling temperature, when the first sensor detects that such a predetermined temperature has been reached the basket is lowered into said water and, at the same time, the timer is started for a preset time period, when the timer reaches the end of such a preset time period the control means deactivate the heating means and command the removal of the basket from the tank.

36. The cooking method according to claim 34 wherein to calculate the boiling point said control means adopt a calculation algorithm which evaluates the slope of the upward curve of the water temperature.

37. The cooking method according to claim 36 wherein said calculation algorithm evaluates an average of the slopes of said upward curve taken at various moments in time.

38. The cooking method according to claim 37 wherein after a predetermined time period from the lowering of the basket into the tank, the stirring means are actuated.

39. The cooking method according to claim 38 wherein said heating means are activated discontinuously, so as to reduce the power, decrease the turbulence of the water and reduce foam production.

40. The cooking method according to claim 39 wherein when the pasta is cooked at a predetermined time of day, said control means activate said heating means at a set time and check the increase in temperature of the water and, in the case in which it is too quick, interrupt the power supply of the electric heating means and calculate the waiting time before starting to heat up again.

* * * * *